United States Patent
Hayakawa et al.

(10) Patent No.: US 11,655,428 B2
(45) Date of Patent: May 23, 2023

(54) LUBRICATING OIL COMPOSITIONS AND LUBRICATING OIL VISCOSITY MODIFIERS

(71) Applicant: MITSUI CHEMICALS, INC., Tokyo (JP)

(72) Inventors: Akio Hayakawa, Kawasaki (JP); Akihiro Udagawa, Chiba (JP); Noriko Kai, Otake (JP); Yuji Tokunaga, Otake (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 17/044,846

(22) PCT Filed: Apr. 16, 2019

(86) PCT No.: PCT/JP2019/016255
§ 371 (c)(1),
(2) Date: Oct. 1, 2020

(87) PCT Pub. No.: WO2019/203210
PCT Pub. Date: Oct. 24, 2019

(65) Prior Publication Data
US 2021/0130725 A1 May 6, 2021

(30) Foreign Application Priority Data

Apr. 17, 2018 (JP) .............................. JP2018-079175
Apr. 17, 2018 (JP) .............................. JP2018-079176

(51) Int. Cl.
*C10M 107/04* (2006.01)
*C10M 143/02* (2006.01)
(Continued)

(52) U.S. Cl.
CPC ........ *C10M 107/04* (2013.01); *C10M 143/02* (2013.01); *C10M 2205/022* (2013.01);
(Continued)

(58) Field of Classification Search
CPC ........ C10M 2290/04; C10M 2205/028; C10M 143/02; C10M 143/04; C10M 143/08;
(Continued)

(56) References Cited

U.S. PATENT DOCUMENTS 6,214,779 B1    4/2001  Kaneshige et al.
6,525,007 B2    2/2003  Okada et al.
(Continued)

FOREIGN PATENT DOCUMENTS

JP    H07-150181 A    6/1995
JP    2000-072825 A   3/2000
(Continued)

OTHER PUBLICATIONS

International Search Report dated Jul. 2, 2019 for corresponding International Patent Application No. PCT/JP2019/016255.
(Continued)

*Primary Examiner* — Vishal V Vasisth
(74) *Attorney, Agent, or Firm* — Foley & Lardner LLP

(57) ABSTRACT

A lubricating oil composition includes an ethylene/α-olefin copolymer (A) having 70 to 90 mole % of structural units derived from ethylene and an intrinsic viscosity [η] of 0.3 to 1.0 dl/g.

12 Claims, 1 Drawing Sheet

(51) Int. Cl.
*C10N 40/25* (2006.01)
*C10N 30/02* (2006.01)
*C10N 40/26* (2006.01)

(52) U.S. Cl.
CPC . *C10M 2205/0225* (2013.01); *C10N 2030/02* (2013.01); *C10N 2040/252* (2020.05); *C10N 2040/255* (2020.05); *C10N 2040/26* (2013.01)

(58) Field of Classification Search
CPC . C10M 169/041; C08F 210/06; C08F 210/16; C08F 210/02; C08F 255/04; C08F 290/042; C08F 210/00
See application file for complete search history.

(56) References Cited

U.S. PATENT DOCUMENTS

| 8,410,035 | B2 | 4/2013 | Kaneshige et al. |
| 10,040,884 | B2 | 8/2018 | Harada et al. |
| 10,329,366 | B2 | 6/2019 | Harada et al. |
| 2002/0055445 | A1 | 5/2002 | Okada et al. |
| 2004/0058830 | A1 | 3/2004 | Kan et al. |
| 2009/0023619 | A1 | 1/2009 | Kaneshige et al. |
| 2017/0114166 | A1 | 4/2017 | Harada et al. |
| 2017/0175028 | A1 | 6/2017 | Yamamoto et al. |
| 2018/0273662 | A1 | 9/2018 | Harada et al. |
| 2018/0320102 | A1 | 11/2018 | Hayakawa et al. |

FOREIGN PATENT DOCUMENTS

| JP | 2005-307099 A | 11/2005 |
| JP | 2013-169685 A | 9/2013 |
| WO | WO-98/33872 A1 | 8/1998 |
| WO | WO-00/34420 A1 | 6/2000 |
| WO | WO-03/038017 A1 | 5/2003 |
| WO | WO-2006/101206 A1 | 9/2006 |
| WO | WO-2015/147215 A1 | 10/2015 |
| WO | WO-2017/082182 A1 | 5/2017 |

OTHER PUBLICATIONS

Written Opinion dated Jul. 2, 2019 for corresponding International Patent Application No. PCT/JP2019/016255.

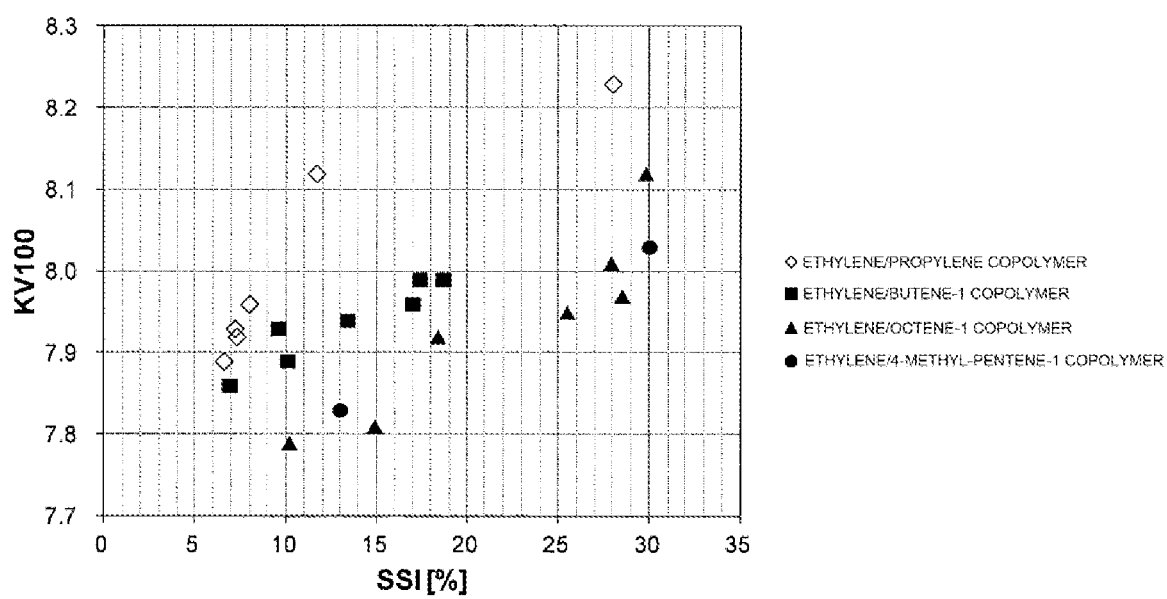

LUBRICATING OIL COMPOSITIONS AND LUBRICATING OIL VISCOSITY MODIFIERS

RELATED APPLICATIONS

The present application claims priority under 37 U.S.C. § 371 to International Patent Application No. PCT/JP2019/016255, filed Apr. 16, 2019, which claims priority to and the benefit of Japanese Patent Application Nos. 2018-079175 and 2018-079176, both filed on Apr. 17, 2018. The contents of these applications are hereby incorporated by reference in their entireties.

TECHNICAL FIELD

The present invention relates to lubricating oil compositions and lubricating oil viscosity modifiers.

BACKGROUND ART

Petroleum products generally change their viscosities widely with temperature, that is, have so-called temperature dependence of viscosity. For example, lubricating oils used in automobiles preferably have small temperature dependence of viscosity. Thus, certain types of polymers soluble in lubricant base oils are used as viscosity modifiers for the purpose of reducing the temperature dependence of viscosity of the lubricating oils.

Ethylene/α-olefin copolymers are widely used as lubricating oil viscosity modifiers. Various improvements have been made to further enhance the balance of the performances of lubricating oils (see, for example, Patent Literature 1).

In recent years, environmental problems such as the depletion of petroleum resources and global warming have led to a demand for enhanced fuel efficiency of automobiles in order to reduce the emissions of exhaust gas pollutants and $CO_2$. Fuel consumption saving with lubricating oils is more cost effective than by physical improvements of machines that are lubricated, and is therefore expected as an important fuel saving technique, resulting in an increased demand for improvements in fuel efficiency by means of lubricating oils.

For example, lowering the kinematic viscosity of lubricating oils at 100° C. is an effective approach to improving fuel efficiency.

The power loss in engines and transmissions is divided into frictional loss at sliding members and oil agitation loss ascribed to the viscosity of lubricating oils. One approach to saving fuel consumption, in particular, by means of engine oils, is to reduce these types of losses. Viscosity reduction is effective for lowering these losses ascribed to engine oils.

The oils that are disclosed in Patent Literature 1 mentioned above are not engine lubricating oils, but are power transmission lubricating oils such as automobile/industrial transmission oils, power steering oils and hydraulic oils. Power transmission lubricating oils are not replaced frequently and thus need to be high in durability. On the other hand, engine lubricating oils are required to use a small amount of a lubricating oil viscosity modifier from the point of view of cost, and to satisfy lubricating characteristics at both low temperatures and high temperatures from the point of view of fuel saving performance. Engine lubricating oils are replaced frequently and thus do not need to be as durable as power transmission lubricating oils. That is, these two types of lubricating oils require different performances.

CITATION LIST

Patent Literature

Patent Literature 1: WO 2006/101206

SUMMARY OF INVENTION

Technical Problem

An object of the present invention is to provide a lubricating oil composition having a reduced viscosity.

While it is preferable that a lubricating oil have excellent shear stability in kinematic viscosity, studies by the present inventors have shown that the lubricating oils provided so far are yet unsatisfactory in terms of good shear stability and small kinematic viscosity at 100° C. It is therefore another object of the present invention to provide a lubricating oil composition having excellent shear stability and a small kinematic viscosity at 100° C., and an associated lubricating oil viscosity modifier.

A further object of the present invention is to provide an engine lubricating oil composition and a viscosity modifier for engine lubricating oils which are each inexpensive and which each can exhibit well-balanced lubricating characteristics at temperatures ranging from low temperatures to high temperatures and thus offer excellent fuel efficiency.

Solution to Problem

The present inventors carried out extensive studies directed to achieving the above objects. As a result, the present inventors have found that the above objects can be attained with lubricating oil compositions described below, thus completing the present invention. For example, the present invention pertains to the following [1] to [11].

[1] A lubricating oil composition comprising an ethylene/α-olefin copolymer (A) having 70 to 90 mole % of structural units derived from ethylene and an intrinsic viscosity [η] of 0.3 to 1.0 dl/g.

[2] The lubricating oil composition described in [1], wherein the copolymer (A) is a copolymer of ethylene and a $C_4$ or higher α-olefin, and has more than 70 mole % and not more than 90 mole % of structural units derived from ethylene, and an intrinsic viscosity [η] of 0.3 to 1.0 dl/g.

[3] The lubricating oil composition described in [1] or [2], wherein the copolymer (A) is a copolymer showing a melting point of not more than 100° C. or no melting point as measured with a differential scanning calorimeter (DSC).

[4] The lubricating oil composition described in any one of [1] to [3], further comprising a lubricant base oil (B).

[5] The lubricating oil composition described in any one of [1] to [4], which is an engine oil.

[6] A lubricating oil viscosity modifier comprising a copolymer of ethylene and a $C_4$ or higher α-olefin, the copolymer having more than 70 mole % and not more than 90 mole % of structural units derived from ethylene, and an intrinsic viscosity [η] of 0.3 to 1.0 dl/g.

[7] The lubricating oil composition described in [1], which has a kinematic viscosity at 100° C. of 7.4 to 14.7 $mm^2/s$ and is an engine lubricating oil composition.

[8] The lubricating oil composition described in [1] or [7],wherein the copolymer (A) is a copolymer showing a melting point of not more than 100° C. or no melting point as measured with a differential scanning calorimeter (DSC), and the composition is an engine lubricating oil composition.

[9] The lubricating oil composition described in [1], [7] or [8],wherein the copolymer (A) has 79 to 90 mole % of structural units derived from ethylene, and the composition is an engine lubricating oil composition.

[10] The lubricating oil composition described in any one of [1] and [7] to [9], which further comprises a lubricant base oil (B) and is an engine lubricating oil composition.

[11] A viscosity modifier for engine lubricating oils, the viscosity modifier comprising an ethylene/α-olefin copolymer having 79 to 90 mole % of structural units derived from ethylene and an intrinsic viscosity [η] of 0.3 to 1.0 dl/g.

Advantageous Effects of Invention

The lubricating oil compositions provided according to the present invention have a reduced viscosity. For example, the lubricating oil composition provided according to the present invention has excellent shear stability and a low kinematic viscosity at 100° C. The viscosity modifier provided according to the present invention may be suitably used for the production of such a lubricating oil composition. Further, the engine lubricating oil compositions and the viscosity modifiers for engine lubricating oils provided according to the present invention are inexpensive and can exhibit well-balanced lubricating characteristics at temperatures ranging from low temperatures to high temperatures, thus offering excellent fuel efficiency.

BRIEF DESCRIPTION OF DRAWING

The Figure is a graph plotting the kinematic viscosity at 100° C. (KV100) versus the shear stability (SSI) of lubricating oil compositions obtained in Examples B, Examples C and Comparative Example B.

DESCRIPTION OF EMBODIMENTS

Embodiments of the present invention will be described hereinbelow.

In the present specification, the numerical ranges "$n_1$ to $n_2$" mean not less than $n_1$ and not more than $n_2$. Here, $n_1$ is the lower limit of the numerical range and $n_2$ is the upper limit of the numerical range.

[Lubricating Oil Compositions]

A lubricating oil composition of the present invention contains a specific ethylene/α-olefin copolymer (A), and preferably further contains a lubricant base oil (B). Here, the copolymer (A) may function as a lubricating oil viscosity modifier.

In an embodiment, the lubricating oil composition of the present invention is an engine lubricating oil composition. In this case, the copolymer (A) may function as a viscosity modifier for engine lubricating oils.

<Ethylene/α-olefin copolymers (A)>

The ethylene/α-olefin copolymers (A) used in the present invention (hereinafter, also written as the "copolymers (A)") will be described. The copolymer (A) has 70 to 90 mole % of structural units derived from ethylene and an intrinsic viscosity [η] of 0.3 to 1.0 dl/g.

Hereinafter, the copolymers (A) will be described with respect to copolymers belonging to the first preferred embodiment and copolymers of the second preferred embodiment.

In the first embodiment, the copolymer (A) is a copolymer of at least ethylene and a $C_4$ or higher α-olefin. By using the copolymer (A) which has structural units from a $C_4$ or higher α-olefin as comonomer units, the lubricating oil composition that is obtained tends to attain excellent shear stability and a low kinematic viscosity at 100° C.

Examples of the α-olefins having 4 or more carbon atoms which constitute the copolymers (A) in the first embodiment include α-olefins having 4 to 20 carbon atoms, preferably 4 to 12 carbon atoms, and more preferably 5 to 8 carbon atoms, such as butene-1, pentene-1, hexene-1, 4-methyl-pentene-1, heptene-1, octene-1, decene-1, undecene-1, dodecene-1, tridecene-1, tetradecene-1, pentadecene-1, hexadecene-1, heptadecene-1, octadecene-1, nonadecene-1 and eicosene-1. The α-olefins may be linear or branched. Of the α-olefins, butene-1, octene-1 and 4-methyl-pentene-1 are preferable, and octene-1 and 4-methyl-pentene-1 are more preferable because they give a low kinematic viscosity at 100° C. and good shear stability to the lubricating oil composition.

The copolymer (A) may have one, or two or more kinds of structural units derived from the α-olefins.

In the copolymer (A) in the first embodiment, the content of structural units derived from ethylene (ethylene units) is more than 70 mole % and not more than 90 mole %, and is preferably not less than 72 mole %, more preferably not less than 74 mole %, and preferably not more than 89 mole %, more preferably not more than 88 mole %. This lower limit of the content ensures that the lubricating oil composition tends to exhibit high shear stability. When the content is not more than the upper limit, good solubility in oils and excellent low-temperature storage stability tend to be obtained.

In the copolymer (A) in the first embodiment, the content of structural units derived from a $C_4$ or higher α-olefin (α-olefin units) is preferably not less than 10 mole % and less than 30 mole %, and is more preferably not less than 11 mole %, still more preferably not less than 12 mole %, and more preferably not more than 28 mole %, still more preferably not more than 26 mole %

In the second embodiment, the copolymer (A) is a copolymer of at least ethylene and an α-olefin. The copolymer (A) of the second embodiment is suitable as a component of the engine lubricating oil composition.

Examples of the α-olefins which constitute the copolymers (A) in the second embodiment include α-olefins having 3 to 20 carbon atoms, and preferably 3 to 12 carbon atoms, such as propylene, butene-1, pentene-1, hexene-1, 4-methylpentene-1, heptene-1, octene-1, decene-1, undecene-1, dodecene-1, tridecene-1, tetradecene-1, pentadecene-1, hexadecene-1, heptadecene-1, octadecene-1, nonadecene-1 and eicosene-1. The α-olefins may be linear or branched. Of the α-olefins, propylene is preferable because it gives good low-temperature viscosity characteristics and shear stability to the engine lubricating oil composition.

The copolymer (A) may have one, or two or more kinds of structural units derived from the α-olefins.

In the copolymer (A) in the second embodiment, having 70 to 90 mole % of structural units derived from ethylene (ethylene units), and is preferably more than 70 mole %, more preferably not less than 72 mole %, still more preferably not less than 74 mole %, particularly preferably not less than 79 mole %, and preferably not more than 89 mole %, more preferably not more than 88 mole %, still more preferably not more than 86 mole % This lower limit of the content ensures that the lubricating oil composition tends to have a low CCS viscosity and high shear stability. When the content is not more than the upper limit, good solubility in oils and excellent low-temperature storage stability tend to be obtained.

In the copolymer (A) in the second embodiment, having preferably 10 to 30 mole % of structural units derived from an α-olefin (α-olefin units), and is more preferably not less than 11 mole %, still more preferably not less than 12 mole %, particularly preferably not less than 14 mole %, and preferably less than 30 mole %, more preferably not more than 28 mole %, still more preferably not more than 26 mole %, particularly preferably not more than 21 mole %

The content of the ethylene-derived structural units is the proportion relative to the total amount of the structural units derived from all the monomers constituting the copolymer (A) (for example, ethylene, a $C_4$ or higher α-olefin or an α-olefin, and other additional monomers) taken as 100 mole %.

Examples of the additional monomers include cyclic olefins, aromatic vinyl compounds, conjugated dienes, nonconjugated polyenes, functionalized vinyl compounds, hydroxyl group-containing olefins and halogenated olefins. Examples of the cyclic olefins, the aromatic vinyl compounds, the conjugated dienes, the nonconjugated polyenes, the functionalized vinyl compounds, the hydroxyl group-containing olefins and the halogenated olefins include those compounds described in paragraphs [0035] to of JP-A-2013-169685.

The intrinsic viscosity [η] of the copolymers (A) is 0.3 to 1.0 dl/g, preferably not less than 0.3 dl/g and less than 1.0 dl/g, more preferably 0.35 to 0.99 dl/g, and particularly preferably 0.40 to 0.98 dl/g. When the intrinsic viscosity [η] is not less than the lower limit, the lubricating oil composition tends to attain a high HTHS viscosity described later and a low CCS viscosity at a low dose of the copolymer (A). When the intrinsic viscosity is not more than the upper limit, the lubricating oil composition tends to attain high shear stability and a low kinematic viscosity at 100° C.

The intrinsic viscosity [η] is measured in decalin at

The copolymer (A) according to the first embodiment, which has more than 70 mole % and not more than 90 mole % of structural units derived from ethylene, and an intrinsic viscosity [η] of 0.3 to 1.0 dl/g, is advantageous in terms of cost because the copolymer, even when added in a small dose, can sufficiently modify the viscosity of the lubricating oil composition in an effective manner.

The copolymer (A) according to the second embodiment, which has 70 to 90 mole % of structural units derived from ethylene, in particular 79 to 90 mole %, and an intrinsic viscosity [η] of 0.3 to 1.0 dl/g, is advantageous in terms of cost because the copolymer, even when added in a small dose, can sufficiently modify the viscosity of the lubricating oil composition in an effective manner.

The copolymers (A) are preferably copolymers which show a melting point of not more than 100° C. or no melting point as measured with a differential scanning calorimeter (DSC), and more preferably copolymers which show a melting point of not more than 95° C. or no melting point. This configuration can contribute to the reduction in the CCS viscosity of the lubricating oil composition.

Details of the conditions for the measurements of the above properties will be described in Examples.

For example, the copolymers (A) may be produced by copolymerizing at least ethylene and an α-olefin using catalysts including a compound which contains a transition metal such as vanadium, zirconium, titanium or hafnium, and at least one selected from organoaluminum compounds, organoaluminum oxy compounds and ionized ionic compounds. Examples of the olefin polymerization catalysts used here include the catalysts described in WO 00/34420.

The copolymers (A) may be used singly, or two or more may be used in combination.

In the lubricating oil composition, for example, the engine lubricating oil composition, of the present invention, the content of the copolymer (A) is usually 0.1 to 5.0 mass %, preferably 0.2 to 4.0 mass %, and particularly preferably 0.3 to 3.0 mass % of the whole composition. In the present invention, the copolymer (A) can effectively modify the viscosity of the composition and produces sufficient effects at a low dose. Thus, the copolymer (A) is advantageous in terms of cost.

<Lubricant Base Oils (B)>

The lubricating oil composition, for example, the engine lubricating oil composition, of the present invention preferably further contains a lubricant base oil (B) (hereinafter, also written as the "base oil (B)"). The base oil (B) is not particularly limited and may be any base oil usually used as a lubricant base oil such as an engine lubricant base oil, with examples including mineral oils and synthetic oils. The base oil (B) may be a blend of a mineral oil and a synthetic oil.

The kinematic viscosity of the base oil (B) at 100° C. is usually 1 to 50 mm$^2$/s, preferably 1.5 to 40 mm$^2$/s, and more preferably 2 to 30 mm$^2$/s.

Mineral oils are generally used after refining processes such as dewaxing, and are classified into several grades depending on the level of refining. Such grades are defined by the API (American Petroleum Institute) classification. Generally, mineral oils containing 0.5 to 10 mass % wax are used. For example, use may be made of a highly refined oil which is refined by hydrocracking, has a low pour point and a high viscosity index, and has a composition based on isoparaffin. Mineral oils having a kinematic viscosity at 40° C. of 10 to 200 mm$^2$/s are generally used.

Examples of the synthetic oils include poly-α-olefins; diesters such as polyol esters, dioctyl phthalate and dioctyl sebacate; and polyalkylene glycols.

Table 1 describes characteristics of groups of lubricant base oils.

TABLE 1

| Groups | Types | Viscosity index*1 | Saturated hydrocarbon content*2 (vol %) | Sulfur content*3 (mass %) |
|---|---|---|---|---|
| (I) *4 | Mineral oils | 80-120 | <90 | >0.03 |
| (II) | Mineral oils | 80-120 | ≥90 | ≤0.03 |
| (III) | Mineral oils | ≥120 | ≥90 | ≤0.03 |
| (IV) | Poly-α-olefins | | | |
| (V) | Other lubricant base oils | | | |

*1Measured in accordance with ASTM D2270 (JIS K2283)
*2Measured in accordance with ASTM D3238
*3Measured in accordance with ASTM D4294 (JIS K2541)
*4 Group (I) also include mineral oils having a saturated hydrocarbon content of less than 90 (vol %) and a sulfur content of less than 0.03 mass %, and mineral oils having a saturated hydrocarbon content of not less than 90 (vol %) and a sulfur content of more than 0.03 mass %.

The poly-α-olefins in Table 1 are hydrocarbon polymers obtained by polymerizing at least a $C_{10}$ or higher α-olefin as a raw material monomer, with examples including polydecene obtained by polymerizing decene-1.

The base oil (B) is preferably a mineral oil belonging to Group (II) or Group (III), or a poly-α-olefin belonging to Group (IV). Group (II) oils and Group (III) oils tend to have a lower wax concentration than Group (I) oils. Of the mineral oils belonging to Group (II) and Group (III), those having a kinematic viscosity at 100° C. of 1 to 50 mm$^2$/s are preferable.

Particularly from the point of view of low-temperature characteristics, the base oil (B) preferably has one or both of the characteristics (B0-1) and (B0-2) below.

(B0-1) The kinematic viscosity at 100° C. is 2 to 10 mm$^2$/s, and preferably 3 to 8 mm$^2$/s. When the kinematic viscosity is in this range, the lubricating oil composition that is obtained attains excellent fluidity and lubricity. When the kinematic viscosity is in this range, the engine lubricating oil composition that is obtained has an excellent CCS viscosity.

(B0-2) The viscosity index is not less than 90, and preferably not less than 100. The upper limit of the viscosity index is not particularly limited, but is, for example, 160 or 130. Base oils having a viscosity index of 90 or more are particularly useful as lubricant base oils such as engine lubricant base oils.

The above characteristics are measured by the following methods.

Kinematic viscosity at 100° C.: The method described in ASTM D445 (JIS K2283).

Viscosity index: The method described in ASTM D2270 (JIS K2283).

The base oils (B) may be used singly, or two or more may be used in combination.

In the lubricating oil composition, for example, the engine lubricating oil composition, of the present invention, the content of the base oil (B) is usually not less than 50 mass %, preferably not less than 70 mass %, and particularly preferably not less than 80 mass % of the whole composition. The upper limit of the content of the base oil (B) is determined depending on the amounts of the copolymer (A) and additives.

When the lubricating oil composition of the present invention is used as a lubricating oil additive composition (a so-called concentrate), the lubricating oil composition may contain 1 to 50 parts by mass of the copolymer (A) and 50 to 99 parts by mass of the base oil (B) (with the proviso that the total of the copolymer (A) and the base oil (B) is 100 parts by mass). This ratio is preferably 2 to 40 parts by mass of the copolymer (A) and 60 to 98 parts by mass of the base oil (B), and more preferably 3 to 30 parts by mass of the copolymer (A) and 70 to 97 parts by mass of the base oil (B).

When the lubricating oil composition of the present invention is used as a lubricating oil additive composition (a so-called concentrate), the composition is usually free from additives described later or contains an oxidation inhibitor described later as required generally in the range of 0.01 to 1 mass %, and preferably 0.05 to 0.5 mass %. The lubricating oil additive composition may contain the base oil (B) and additives described below as required to serve as an engine lubricating oil composition or other type of lubricating oil composition.

<Other Components (Additives)>

The lubricating oil composition, for example, the engine lubricating oil composition, of the present invention may contain additional components (additives) other than the copolymer (A) and the base oil (B). Examples of the additional components include viscosity modifiers other than the copolymers (A), pour-point depressants, detergent dispersants, antiwear agents, antifoaming agents, oxidation inhibitors, friction modifiers, color stabilizers, antirust agents, corrosion inhibitors and metal deactivators.

Examples of such other viscosity modifiers include polymers such as polyisobutenes, polymethacrylic acid esters, diene polymers, polyalkylstyrenes, esterified styrene-maleic anhydride copolymers, alkenylarene-conjugated diene copolymers and polyolefins, hydrogenated SBRs (styrene butadiene rubbers) and SEBSs (styrene ethylene butylene styrene block copolymers). Multifunctional viscosity modifiers which also offer dispersibility and/or antioxidant properties are known and may be used appropriately.

Examples of the pour-point depressants include alkylated naphthalenes, alkyl (meth)acrylate (co)polymers, copolymers of alkyl fumarates and vinyl acetate, α-olefin polymers, and copolymers of α-olefins and styrene. In particular, alkyl (meth)acrylate (co)polymers are preferable.

Examples of the detergent dispersants include sulfonates such as calcium sulfonate and magnesium sulfonate; phenates; salicylates; succinimides; and benzylamines. Typically, the amount of the detergent dispersant in the lubricating oil composition is not particularly limited as long as the advantageous effects of the present invention are obtained, but is usually 1 to 10 mass %, preferably 1.5 to 9.0 mass %, and more preferably 2.0 to 8.0 mass %. Incidentally, this amount is defined based on the assumption that the detergent dispersant is free from oils (that is, there is no diluent oils conventionally supplied thereto).

Examples of the antiwear agents include phosphorus-containing antiwear agents and extreme pressure agents such as thiophosphoric acid metal salts, phosphoric acid esters and salts thereof, phosphorus-containing carboxylic acids, esters, ethers and amides, and phosphorus acid salts. In most cases, the antiwear agent is a zinc dialkyldithiophosphate (ZDP). A typical ZDP may contain 11 mass % P (calculated based on the oil-free mass), and the amount may be preferably 0.09 to 0.82 mass %. Some example phosphorus-free antiwear agents are boric acid esters (including borate epoxides), dithiocarbamate compounds, molybdenum-containing compounds and sulfurized olefins. The amount of the phosphorus-containing antiwear agent is not particularly limited as long as the advantageous effects of the present invention are obtained, but the agent may be usually present in such an amount that it gives 0.01 to 0.2 mass % phosphorus, preferably 0.015 to 0.15 mass % phosphorus, more preferably 0.02 to 0.1 mass % phosphorus, and still more preferably 0.025 to 0.08 mass % phosphorus.

Examples of the antifoaming agents include silicon antifoaming agents such as dimethylsiloxane and silica gel dispersions; alcohol antifoaming agents; and ester antifoaming agents.

Examples of the oxidation inhibitors include phenolic oxidation inhibitors such as 2,6-di-t-butyl-4-methylphenol; and amine oxidation inhibitors such as dioctyldiphenylamine. It is needless to mention that the typical amounts of the oxidation inhibitors depend on the types of the oxidation inhibitors and the individual effectiveness. For example, the total amount thereof may be 0.01 to 5 mass %, preferably 0.15 to 4.5 mass %, and more preferably 0.2 to 4 mass %. One or more oxidation inhibitors may be used. A particular combination of the oxidation inhibitors may produce synergetic effects over the total effects of the inhibitors combined.

Examples of the antirust agents include carboxylic acids, carboxylic acid salts, esters and phosphoric acid. Examples of the corrosion inhibitors include benzotriazole compounds, thiadiazole compounds and imidazole compounds.

When the lubricating oil composition (for example, the engine lubricating oil composition) of the present invention contains additives, the content thereof is not particularly limited. The total content of additives based on the total of the base oil (B) and all the additives taken as 100 mass % is usually more than 0 mass %, preferably 1 mass % or more, and more preferably 3 mass % or more; and is usually 40 mass % or less, preferably 30 mass % or less, and still more preferably 20 mass % or less.

<Methods for Producing Lubricating Oil Compositions and Engine Lubricating Oil Compositions>

The lubricating oil composition, for example, the engine lubricating oil composition, of the present invention may be prepared by mixing, for example, the copolymer (A) and optionally the base oil (B) and additives in a conventional manner. The copolymer (A) is easy to handle and thus may be supplied optionally as a concentrate to the base oil (B).

<Properties of Lubricating Oil Compositions>

In order to improve, for example, the fuel efficiency during engine operation at a high temperature, the lubricating oil composition of the present invention preferably has a low viscosity at a high temperature and a low shear rate. That is, the lubricating oil composition of the present invention usually has a kinematic viscosity at 100° C. of not more than 50 mm$^2$/s, preferably 1 to 40 mm$^2$/s, and more preferably 2 to 30 mm$^2$/s.

Further, the lubricating oil composition of the present invention has stability to shear force, for example, at the time of engine start and during engine operation (for example, this stability is evaluated as the shear stability index (SSI) described later).

When the lubricating oil composition of the present invention is used as, for example, an engine oil, it is preferable that the composition offer a small frictional loss at sliding members and a small oil agitation loss ascribed to the lubricant viscosity. It is preferable that engine lubricating oils have a viscosity which allows lubricity (an oil film) to be maintained under high-temperature and high-shear rate conditions in order to ensure that sliding members will be protected during engine operation at high temperatures (for example, this viscosity is evaluated as the high temperature high shear (HTHS) viscosity described later).

The lubricating oil compositions of the present invention, in particular, the lubricating oil compositions containing the copolymer (A) of the first embodiment, are excellent in the balance of the above properties, and specifically have a low 100° C. kinematic viscosity and good shear stability.

Thus, the lubricating oil compositions of the present invention may lubricate numerous known mechanical devices by serving as, for example, automobile engine oils, large-vehicle diesel engine lubricating oils, ship diesel engine lubricating oils, two-stroke engine lubricating oils, automatic transmission and manual transmission lubricating oils, gear lubricating oils and greases.

The engine lubricating oil compositions containing the copolymer (A) of the second embodiment (hereinafter, also written as the "engine lubricating oil compositions of the present invention") will be described below.

It is preferable that engine lubricating oils offer a small frictional loss at sliding members and a small oil agitation loss ascribed to the lubricant viscosity. It is preferable that engine lubricating oils have a viscosity which allows lubricity (an oil film) to be maintained under high-temperature and high-shear rate conditions in order to ensure that sliding members will be protected during engine operation at high temperatures (for example, this viscosity is evaluated as the high temperature high shear (HTHS) viscosity described later), and also have a low viscosity under low-temperature and high-shear rate conditions in order to improve the fuel efficiency at the time of engine start at low temperatures (for example, this viscosity is evaluated as the cold cranking simulator (CCS) viscosity described later).

Further, in order to improve the fuel efficiency during engine operation at high temperatures, it is preferable that the viscosity under high-temperature and low-shear rate conditions fall within a specific range. For example, a lower kinematic viscosity produces a lower viscous resistance and is more effective for fuel saving. On the other hand, an excessively low kinematic viscosity results in a small thickness of an oil film and may deteriorate lubricity. In order to satisfy the balance between these facts, it is desirable that the kinematic viscosity at 100° C. be within a specific range. That is, the engine lubricating oil composition of the present invention usually has a kinematic viscosity at 100° C. of 7.4 to 14.7 mm$^2$/s, preferably 7.5 to 14.5 mm$^2$/s, and more preferably 7.6 to 14.0 mm$^2$/s.

Further, it is preferable that engine lubricating oils have stability to shear force at the time of engine start and during engine operation (for example, this stability is evaluated as the shear stability index (SSI) described later).

The engine lubricating oil composition of the present invention is excellent in the balance of the above properties, and particularly has a low CCS viscosity, a specific kinematic viscosity and good shear stability. Thus, the engine lubricating oil composition of the present invention is useful as, for example, an engine oil such as a gasoline engine oil or a diesel engine oil, and is specifically useful as an engine oil for such engines as automobile gasoline engines, motorcycle gasoline engines, large-vehicle diesel engines and ship diesel engines.

[Lubricating Oil Viscosity Modifiers]

A lubricating oil viscosity modifier of the present invention contains the copolymer (A) of ethylene and a $C_4$ or higher α-olefin of the above-mentioned first embodiment. The preferred requirements of the copolymer (A) of the first embodiment are already described hereinabove.

The content of the copolymer (A) of the first embodiment in the lubricating oil viscosity modifier of the present invention is usually not less than 5 mass %, preferably not less than 25 mass %, and more preferably not less than 50 mass %.

As long as the content of the copolymer (A) is within the above range, the lubricating oil viscosity modifier of the present invention may further contain at least one selected from the base oils (B) and the additives described hereinabove.

[Viscosity Modifiers for Engine Lubricating Oils]

A viscosity modifier for engine lubricating oils according to the present invention contains the ethylene/α-olefin copolymer (A) of the second embodiment described hereinabove. Here, the copolymer (A) has 79 to 90 mole % of structural units derived from ethylene. Other preferred requirements of the copolymer (A) are already described hereinabove.

The content of the copolymer (A) of the second embodiment in the viscosity modifier of the present invention is usually not less than 5 mass %, preferably not less than 25 mass %, and more preferably not less than 50 mass %.

As long as the content of the copolymer (A) is within the above range, the viscosity modifier of the present invention may further contain at least one selected from the base oils (B) and the additives described hereinabove.

EXAMPLES

The present invention will be described in further detail based on Examples hereinbelow. However, it should be construed that the scope of the present invention is not limited to such Examples.

[Properties of Copolymers]

Properties of copolymers were measured as follows.

<Intrinsic Viscosity [η] (dl/g)>

The intrinsic viscosity [η] of a copolymer was measured at 135° C. using a decalin solvent. Specifically, approximately 20 mg of a powder, pellets or a resin mass of the copolymer was dissolved into 15 ml of decalin, and the specific viscosity ηsp was measured in an oil bath at 135° C. This decalin solution was diluted by the addition of 5 ml of decalin solvent, and the specific viscosity ηsp was measured in the same manner. This dilution operation was repeated two more times, and the concentration (C) was extrapolated to 0. The value of ηsp/C at zero concentration was obtained as the intrinsic viscosity (see the following equation).

$$[\eta]=lim(\eta sp/C)(C\to 0)$$

<Content of Ethylene Units (C2 Content)>

The contents (mole %) of ethylene-derived structural units and of α-olefin-derived structural units in an ethylene/α-olefin copolymer were determined by analyzing a $^{13}$C-NMR spectrum.

(Measurement Device)

Nuclear magnetic resonance device AVANCE III500 CryoProbe Prodigy manufactured by Bruker BioSpin.

(Measurement Conditions)

Nucleus of interest: $^{13}$C (125 MHz), measurement mode: single pulse proton broadband decoupling, pulse width: 45° (5.00 μsec), number of points: 64 k, measurement range: 250 ppm (−55 to 195 ppm), repeating time: 5.5 sec, number of scans: 512, measurement solvent: orthodichlorobenzene/benzene-$d_6$ (4/1 v/v), sample concentration: ca. 60 mg/0.6 mL, measurement temperature: 120° C., window function: exponential (BF: 1.0 Hz), chemical shift reference: benzene-$d_6$ (128.0 ppm).

<DSC Measurement>

The melting point of an ethylene/α-olefin copolymer was measured as described below using a differential scanning calorimeter (X-DSC7000) from SII calibrated with indium standard.

Approximately 10 mg of the measurement sample (the ethylene/α-olefin copolymer) was weighed on an aluminum DSC pan. A lid was crimped onto the pan to form a sample pan with a closed atmosphere. The sample pan was placed into a DSC cell, and an empty aluminum pan was placed as a reference. In a nitrogen atmosphere, the DSC cell was heated from 30° C. (room temperature) to 150° C. at 10° C./min (first heating process). Next, the DSC cell was held at 150° C. for 5 minutes, and cooled to −100° C. at 10° C./min (cooling process). After being held at −100° C. for 5 minutes, the DSC cell was heated to 150° C. at 10° C./min (second heating process).

The temperature at the top of the peak ascribed to the melting in the enthalpy curve obtained in the second heating process was adopted as the melting point (Tm). When there were two or more melting peaks, the largest peak was used to define the temperature Tm. The absence of any melting points means that the copolymer was amorphous.

[Properties of Lubricating Oil Compositions]

<High Temperature High Shear (HTHS) Viscosity>

The HTHS viscosity (150° C.) of lubricating oil compositions was measured at 150° C. and $10^6$ s$^{-1}$ based on ASTM D4683. The lower limit of the HTHS viscosity for engine protection is specified by the SAE viscosity classification. Thus, the lubricating oil compositions were formulated so that their HTHS viscosities would be similar, and the fuel saving performances of the lubricating oil compositions were compared by comparing various viscosity characteristics.

<(Kinematic Viscosity (KV) at 100° C.>

The kinematic viscosity (KV) of the lubricating oil compositions at 100° C. was measured based on ASTM D445. Provided that the HTHS viscosities of lubricating oil compositions are similar, the lower the kinematic viscosity of the lubricating oil composition, the more excellent the lubricating oil composition is in fuel saving performance at high temperatures. If, on the other hand, the kinematic viscosity is too low, the lubricity may be poor. In order to satisfy the balance of these properties, it may be desirable that the kinematic viscosity be in a specific range.

<Cold Cranking Simulator (CCS) Viscosity>

The CCS viscosity (−35° C.) of the lubricating oil compositions was measured based on ASTM D5393. The CCS viscosity is used to evaluate the slidability (startability) of a crankshaft at low temperatures. The lower the CCS viscosity, the more excellent the low-temperature viscosity (low-temperature characteristics) of the lubricating oil. Provided that the HTTS viscosities of lubricating oil compositions are similar, the lower the CCS viscosity of the lubricating oil composition, the more excellent the lubricating oil composition is in fuel saving performance at low temperatures (low-temperature startability).

<Shear Stability Index (SSI)>

The SSI of the lubricating oil compositions was measured by an ultrasonic method with reference to the JPI-5S-29-88 standard. The lubricating oil composition was ultrasonicated, and the SSI was determined from the rate of decrease in kinematic viscosity before and after the ultrasonication. The SSI is an index of the decrease in kinematic viscosity stemming from the breakage of molecular chains of a copolymer component in a lubricating oil by a sliding shear force. The larger the SSI value, the greater the decrease in kinematic viscosity.

(Measurement Device)

Ultrasonic shear stability tester US-300TCVP (manufactured by Primtech)

(Measurement Conditions)

Oscillation frequency: 10 kHz

Test temperature: 40° C.

Ultrasonication horn position: 2 mm below the liquid level (Measurement Procedure)

30 ml of the sample is placed into a sample container and is ultrasonicated at an output voltage of 4.2 V for 30 minutes. The kinematic viscosity of the sample oil is measured at 100° C. before and after the ultrasonication. The SSI is calculated from the following equation.

$$SSI(\%)=100\times(Vo-Vs)/(Vo-Vb)$$

Vo: 100° C. Kinematic viscosity (mm$^2$/s) before ultrasonication

Vs: 100° C. Kinematic viscosity (mm$^2$/s) after ultrasonication

Vb: 100° C. Kinematic viscosity (mm$^2$/s) of lubricating oil composition or engine oil (lubricating oil composition) prepared using 0 mass % lubricating oil viscosity modifier component (ethylene/α-olefin copolymer obtained in Polymerization Example described below).

[Polymerization Examples 1A and 1B]

Polymerization Examples for the production of ethylene/α-olefin copolymers will be described below. The polymerization was performed multiple times in some cases in order to ensure that the amount obtained was sufficient for analysis and the evaluation of the lubricating oil modifier.

The compound (1) of the following formula used as a catalyst was synthesized by a known method.

[Chem. 1]

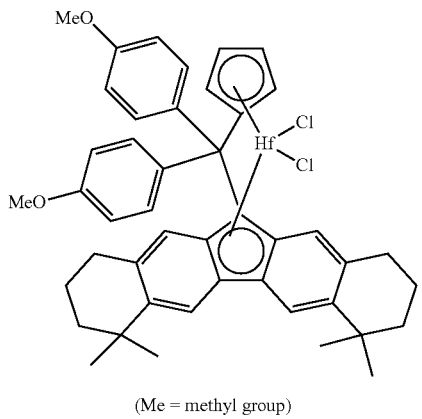

Compound (1)

(Me = methyl group)

A 0.95 L volume continuous pressure polymerization reactor equipped with a stirring blade was thoroughly purged with nitrogen. A hexane solution of the above compound (1) (0.020 mmol/L), a hexane solution of triphenylcarbeniumtetrakis(pentafluorophenyl) borate (also written as $Ph_3CB(C_6F_5)_4$) (0.2 mmol/L), and a hexane solution of triisobutylaluminum (also written as $iBu_3Al$) (5.0 mmol/L) were continuously supplied through one of the supply ports of the reactor at flow rates of 55 mL/h, 22 mL/h and 100 mL/h, respectively. At the same time, 251 g/h ethylene, 122 g/h propylene and 6.2 NL/h hydrogen were continuously supplied through another supply port of the continuous polymerization reactor. Dehydrated and purified n-hexane was continuously supplied through the above two supply ports and also the uppermost port of the polymerization reactor at a total flow rate of 2,760 mL/h. The continuous solution polymerization was performed at a polymerization temperature of 111° C., a total pressure of 3.6 MPa-G (G=Gauge pressure) and a stirring rate of 700 rpm. The heat of the polymerization reaction was removed by circulating a refrigerant through a jacket provided around the outer circumference of the polymerization reactor.

The hexane solution which contained an ethylene/propylene copolymer resulting from the polymerization under the above conditions was continuously discharged at a rate of 189 kg ethylene/propylene copolymer per hour through an outlet disposed at the top of the polymerization reactor while maintaining the pressure at 3.6 MPa-G. The polymerization solution obtained was poured into a large amount of methanol to precipitate the ethylene/propylene copolymer. The ethylene/propylene copolymer was dried under reduced pressure at 180° C. for 1 hour. The properties of the polymers obtained are described in Table 2A and Table 2-1B.

[Polymerization Examples 2A to 10A]

Polymerization was performed in the same manner as in Polymerization Example 1A, except that the polymerization conditions were changed as described in Table 2A. In Polymerization Examples 7A and 8A, a hexane solution of the compound (1) (0.038 mmol/L), a hexane solution of $Ph_3CB(C_6F_5)_4$ (0.30 mmol/L), and a hexane solution of $iBu_3Al$ (5.0 mmol/L) were used.

TABLE 2A

| | | Polym. Ex. 1A | Polym. Ex. 2A | Polym. Ex. 3A | Polym. Ex. 4A | Polym. Ex. 5A | Polym. Ex. 6A | Polym. Ex. 7A | Polym. Ex. 8A | Polym. Ex. 9A | Polym. Ex. 10A |
|---|---|---|---|---|---|---|---|---|---|---|---|
| Hexane solution of compound (1) | mL/h | 55 | 45 | 55 | 60 | 55 | 45 | 30 | 30 | 40 | 45 |
| Hexane solution of $Ph_3CB(C_6F_5)_4$ | mL/h | 22 | 18 | 22 | 24 | 22 | 18 | 15 | 15 | 16 | 18 |
| Hexane solution of $iBu_3Al$ | mL/h | 100 | 100 | 100 | 100 | 100 | 100 | 100 | 100 | 100 | 100 |
| Ethylene | g/h | 251 | 251 | 251 | 251 | 251 | 376 | 143 | 157 | 157 | 251 |
| Propylene | g/h | 122 | 122 | 122 | 122 | 122 | 122 | 306 | 306 | 122 | 122 |
| Hydrogen | NL/h | 6.2 | 4.2 | 2.7 | 4.2 | 4.2 | 6.2 | 1.3 | 1.5 | 5 | 2.2 |
| Dehydrated purified n-hexane | mL/h | 2,760 | 2,760 | 2,760 | 2,760 | 2,760 | 2,760 | 2,400 | 2,400 | 1,760 | 2,760 |
| Polymerization temperature | ° C. | 111 | 111 | 111 | 112 | 111 | 115 | 112 | 110 | 111 | 112 |
| Discharge rate | kg/h | 189 | 188 | 192 | 221 | 208 | 165 | 239 | 245 | 136 | 209 |
| C2 content | mole % | 83.2 | 82.8 | 80.5 | 77.9 | 80.8 | 87.1 | 52.2 | 55.5 | 73 | 81.8 |
| [η] | dl/g | 0.51 | 0.66 | 0.9 | 0.62 | 0.64 | 0.68 | 1.65 | 1.23 | 0.23 | 1.07 |
| Tm | ° C. | 66.6 | 66.8 | 55.7 | 47.5 | 60.1 | 86.3 | None | None | 34 | 59 |

[Polymerization Examples 2B to 22B]

Polymerization was performed in the same manner as in Polymerization Example 1B, except that the polymerization conditions were changed as described in Tables 2-1B and 2-2B. In Polymerization Example 6B, a hexane solution of the compound (1) (0.038 mmol/L), a hexane solution of $Ph_3CB(C_6F_5)_4$ (0.30 mmol/L), and a hexane solution of $iBu_3Al$ (5.0 mmol/L) were used. In Polymerization Examples 21B and 22B, a hexane solution of the compound (1) (0.015 mmol/L), a hexane solution of Ph3CB(C6F5)4 (1.2 mmol/L), and a hexane solution of iBu3Al (5.0 mmol/L) were used. Further, propylene as a comonomer was replaced by butene-1 in Polymerization Examples 7B to 13B, by octene-1 in Polymerization Examples 14B to 20B, and by 4-methyl-pentene-1 in Polymerization Examples 21B and 22B.

TABLE 2-1B

|  |  | Polym. Ex. 1B | Polym. Ex. 2B | Polym. Ex. 3B | Polym. Ex. 4B | Polym. Ex. 5B | Polym. Ex. 6B | Polym. Ex. 7B |
|---|---|---|---|---|---|---|---|---|
| Hexane solution of compound (1) | mL/h | 55 | 45 | 55 | 60 | 55 | 30 | 50 |
| Hexane solution of $Ph_3CB(C_6F_5)_4$ | mL/h | 22 | 18 | 22 | 24 | 22 | 15 | 20 |
| Hexane solution of $iBu_3Al$ | mL/h | 100 | 100 | 100 | 100 | 100 | 100 | 100 |
| Ethylene | g/h | 251 | 251 | 251 | 251 | 251 | 157 | 160 |
| Propylene | g/h | 122 | 122 | 122 | 122 | 122 | 306 | 0 |
| Butene-1 | g/h | 0 | 0 | 0 | 0 | 0 | 0 | 144 |
| Octene-1 | g/h | 0 | 0 | 0 | 0 | 0 | 0 | 0 |
| 4-Methyl-pentene-1 | g/h | 0 | 0 | 0 | 0 | 0 | 0 | 0 |
| Hydrogen | NL/h | 6.2 | 4.2 | 2.7 | 4.2 | 4.2 | 1.5 | 3.7 |
| Dehydrated purified n-hexane | mL/h | 2760 | 2760 | 2760 | 2760 | 2760 | 2400 | 1560 |
| Polymerization temperature | °C. | 111 | 111 | 111 | 112 | 111 | 110 | 110 |
| Discharge rate | kg/h | 189 | 188 | 192 | 221 | 208 | 245 | 130 |
| C2 content | mole % | 83.2 | 82.8 | 80.5 | 77.9 | 80.8 | 55.5 | 81.2 |
| [η] | dl/g | 0.51 | 0.66 | 0.9 | 0.62 | 0.64 | 1.23 | 0.47 |
| Tm | °C. | 66.6 | 66.8 | 55.7 | 47.5 | 60.1 | None | 47.9 |

|  |  | Polym. Ex. 8B | Polym. Ex. 9B | Polym. Ex. 10B | Polym. Ex. 11B | Polym. Ex. 12B | Polym. Ex. 13B |
|---|---|---|---|---|---|---|---|
| Hexane solution of compound (1) | mL/h | 50 | 50 | 80 | 50 | 50 | 50 |
| Hexane solution of $Ph_3CB(C_6F_5)_4$ | mL/h | 20 | 20 | 32 | 20 | 20 | 20 |
| Hexane solution of $iBu_3Al$ | mL/h | 100 | 100 | 100 | 100 | 100 | 100 |
| Ethylene | g/h | 160 | 160 | 116 | 160 | 179 | 217 |
| Propylene | g/h | 0 | 0 | 0 | 0 | 0 | 0 |
| Butene-1 | g/h | 144 | 144 | 144 | 144 | 144 | 144 |
| Octene-1 | g/h | 0 | 0 | 0 | 0 | 0 | 0 |
| 4-Methyl-pentene-1 | g/h | 0 | 0 | 0 | 0 | 0 | 0 |
| Hydrogen | NL/h | 2.4 | 1.4 | 1.0 | 1.7 | 2.5 | 3.2 |
| Dehydrated purified n-hexane | mL/h | 1560 | 1560 | 1560 | 1560 | 1560 | 2260 |
| Polymerization temperature | °C. | 111 | 111 | 110 | 111 | 110 | 109 |
| Discharge rate | kg/h | 143 | 139 | 112 | 140 | 119 | 144 |
| C2 content | mole % | 80 | 78.6 | 74.5 | 77.7 | 82.5 | 87.1 |
| [η] | dl/g | 0.62 | 0.85 | 0.78 | 0.72 | 0.67 | 0.78 |
| Tm | °C. | 38.8 | 34.8 | 19 | 33.8 | 49.8 | 68.7 |

TABLE 2-2B

|  |  | Polym. Ex. 14B | Polym. Ex. 15B | Polym. Ex. 16B | Polym. Ex. 17B | Polym. Ex. 18B | Polym. Ex. 19B | Polym. Ex. 20B | Polym. Ex. 21B | Polym. Ex. 22B |
|---|---|---|---|---|---|---|---|---|---|---|
| Hexane solution of compound (1) | mL/h | 90 | 90 | 85 | 48 | 43 | 95 | 120 | 200 | 80 |
| Hexane solution of $Ph_3CB(C_6F_5)_4$ | mL/h | 36 | 36 | 34 | 19 | 17 | 38 | 40 | 100 | 40 |
| Hexane solution of $iBu_3Al$ | mL/h | 100 | 100 | 100 | 100 | 100 | 100 | 100 | 100 | 100 |
| Ethylene | g/h | 116 | 116 | 116 | 116 | 116 | 116 | 116 | 155 | 172 |
| Propylene | g/h | 0 | 0 | 0 | 0 | 0 | 0 | 0 | 0 | 0 |
| Butene-1 | g/h | 0 | 0 | 0 | 0 | 0 | 0 | 0 | 0 | 0 |
| Octene-1 | g/h | 180 | 180 | 180 | 396 | 360 | 300 | 108 | 0 | 0 |
| 4-Methyl-pentene-1 | g/h | 0 | 0 | 0 | 0 | 0 | 0 | 0 | 257 | 257 |
| Hydrogen | NL/h | 2.0 | 1.2 | 0.7 | 1.2 | 1.1 | 1.1 | 0.8 | 4.7 | 2.1 |
| Dehydrated purified n-hexane | mL/h | 1550 | 1300 | 1300 | 700 | 800 | 1500 | 1500 | 2610 | 2610 |
| Polymerization temperature | °C. | 110 | 110 | 110 | 111 | 110 | 110 | 110 | 71 | 72 |
| Discharge rate | kg/h | 150 | 152 | 159 | 198 | 120 | 147 | 110 | 218 | 283 |
| C2 content | mole % | 79 | 78.6 | 76.1 | 70.5 | 73.2 | 82.6 | 86.3 | 80.4 | 80.9 |
| [η] | dl/g | 0.51 | 0.66 | 0.9 | 0.69 | 0.78 | 0.63 | 0.86 | 0.49 | 0.81 |
| Tm | °C. | 43.1 | 27.9 | 30.9 | 3.85 | 9.71 | 52.6 | 45.9 | −0.8 | 13.2 |

[Examples A and Comparative Examples A]

Lubricating oil compositions were prepared using the ethylene/propylene copolymers obtained in Polymerization Examples as lubricating oil viscosity modifiers. The amounts of the ethylene/propylene copolymers were controlled so that the HTHS of the lubricating oil compositions at 150° C. would be about 2.6 mPa·s.

The formulations were as follows.

API Group (III) base oil ("Yubase-4", manufactured by SK Lubricants, kinematic viscosity at 100° C.: 4.212 mm²/s, viscosity index: 123)

Additive*: 8.64 mass %

Pour-point depressant: 0.3 mass %

(polymethacrylate "LUBRAN 165", manufactured by TOHO Chemical Industry Co., Ltd.)

Ethylene/propylene copolymer: 0.53 to 2.92 mass % (as shown in Table 3A)

Total 100.0 (mass %)

Note (*) Additive=Conventional GF-5 engine oil additive package including Ca and Na overbased detergents, N-containing dispersant, aminic and phenolic oxidation inhibitors, zinc dialkyldithiophosphates, friction modifier and anti-foaming agent.

The evaluation results are described in Table 3A.

TABLE 3A

| Examples/Comparative Examples<br>Polymerization Examples | | Ex. 1A<br>Polym.<br>Ex. 1A | Ex. 2A<br>Polym.<br>Ex. 2A | Ex. 3A<br>Polym.<br>Ex. 3A | Ex. 4A<br>Polym.<br>Ex. 4A | Ex. 5A<br>Polym.<br>Ex. 5A | Ex. 6A<br>Polym.<br>Ex. 6A | Comp.<br>Ex.1A<br>Polym.<br>Ex. 7A | Comp.<br>Ex. 2A<br>Polym.<br>Ex. 8A | Comp.<br>Ex. 3A<br>Polym.<br>Ex. 9A | Comp.<br>Ex. 4A<br>Polym.<br>Ex. 10A |
|---|---|---|---|---|---|---|---|---|---|---|---|
| Amount of polymer | % | 1.35 | 1.07 | 0.85 | 1.12 | 1.1 | 1.02 | 0.53 | 0.63 | 2.92 | 0.72 |
| HTHS (150° C.) | mPa · s | 2.6 | 2.6 | 2.6 | 2.6 | 2.6 | 2.6 | 2.6 | 2.6 | 2.6 | 2.6 |
| Kinematic viscosity (100° C.) | mm²/s | 7.89 | 7.96 | 8.12 | 7.92 | 7.93 | 7.94 | 8.5 | 8.23 | 7.83 | 8.14 |
| CCS viscosity (−35° C.) | mPa · s | 5360 | 5280 | 5190 | 5430 | 5350 | 5240 | 5820 | 5860 | 7470 | 5140 |
| SSI | % | 7 | 8 | 12 | 7 | 7 | 11 | 44 | 28 | 7 | 15 |

[Examples B, Examples C and Comparative Example B]

Lubricating oil compositions were prepared using the ethylene/α-olefin copolymers obtained in Polymerization Examples as lubricating oil viscosity modifiers. The amounts of the ethylene/α-olefin copolymers were controlled so that the HTHS of the lubricating oil compositions at 150° C. would be about 2.6 mpa·s.

The formulations were as follows.

API Group (III) base oil ("Yubase-4", manufactured by SK Lubricants, kinematic viscosity at 100° C.: 4.212 mm²/s, viscosity index: 123)

Additive*: 8.64 mass %

Pour-point depressant: 0.3 mass %

(polymethacrylate "LUBRAN 165", manufactured by TOHO Chemical Industry Co., Ltd.)

Ethylene/α-olefin copolymer: 0.63 to 1.44 mass % (as shown in Table 3B)

Total 100.0 (mass %)

Note (*) Additive=Conventional GF-5 engine oil additive package including Ca and Na overbased detergents, N-containing dispersant, aminic and phenolic oxidation inhibitors, zinc dialkyldithiophosphates, friction modifier and anti-foaming agent.

The evaluation results are described in Table 3B.

TABLE 3B

| | | | Polymer properties | | | Amount | Lubricating oil properties | | |
|---|---|---|---|---|---|---|---|---|---|
| Examples/<br>Comparative<br>Example | Polymerization<br>Examples | Comonomer | [η]<br>[dl/g] | C2<br>content<br>[mole %] | Tm<br>(DSC)<br>[° C.] | of<br>polymer<br>[%] | HTHS<br>150° C.<br>[mPa · s] | Kinematic<br>viscosity<br>100° C.<br>[mm2/s] | SSI<br>[%] |
| Ex. 1C | Polym. Ex. 1B | Propylene | 0.51 | 83.2 | 66.6 | 1.35 | 2.6 | 7.89 | 7 |
| Ex. 2C | Polym. Ex. 2B | Propylene | 0.66 | 82.8 | 66.8 | 1.07 | 2.6 | 7.96 | 8 |
| Ex. 3C | Polym. Ex. 3B | Propylene | 0.9 | 80.5 | 55.7 | 0.85 | 2.6 | 8.12 | 12 |
| Ex. 4C | Polym. Ex. 4B | Propylene | 0.62 | 77.9 | 47.5 | 1.12 | 2.6 | 7.92 | 7 |
| Ex. 5C | Polym. Ex. 5B | Propylene | 0.64 | 80.8 | 60.1 | 1.1 | 2.6 | 7.93 | 7 |
| Comp. Ex. 1B | Polym. Ex. 6B | Propylene | 1.23 | 55.5 | None | 0.63 | 2.6 | 8.23 | 28 |
| Ex. 1B | Polym. Ex. 7B | Butene-1 | 0.47 | 81.2 | 47.9 | 1.44 | 2.6 | 7.86 | 7 |
| Ex. 2B | Polym. Ex. 8B | Butene-1 | 0.62 | 80 | 38.8 | 1.16 | 2.6 | 7.93 | 10 |
| Ex. 3B | Polym. Ex. 9B | Butene-1 | 0.85 | 78.6 | 34.8 | 0.89 | 2.6 | 7.99 | 19 |
| Ex. 4B | Polym. Ex. 10B | Butene-1 | 0.78 | 74.5 | 19 | 0.99 | 2.6 | 7.96 | 17 |
| Ex. 5B | Polym. Ex. 11B | Butene-1 | 0.72 | 77.7 | 33.8 | 1.02 | 2.6 | 7.94 | 13 |
| Ex. 6B | Polym. Ex. 12B | Butene-1 | 0.67 | 82.5 | 49.8 | 1.09 | 2.6 | 7.89 | 10 |

TABLE 3B-continued

| | | Polymer properties | | | | Lubricating oil properties | | |
| | | | | | | Amount | HTHS | Kinematic viscosity | |
| Examples/ Comparative Example | Polymerization Examples | Comonomer | [η] [dl/g] | C2 content [mole %] | Tm (DSC) [° C.] | of polymer [%] | 150° C. [mPa · s] | 100° C. [mm2/s] | SSI [%] |
|---|---|---|---|---|---|---|---|---|---|
| Ex. 7B | Polym. Ex. 13B | Butene-1 | 0.78 | 87.1 | 68.7 | 0.93 | 2.6 | 7.99 | 17 |
| Ex. 8B | Polym. Ex. 14B | Octene-1 | 0.51 | 79 | 43.1 | 1.4 | 2.6 | 7.79 | 10 |
| Ex. 9B | Polym. Ex. 15B | Octene-1 | 0.66 | 78.6 | 27.9 | 1.15 | 2.6 | 7.92 | 18 |
| Ex. 10B | Polym. Ex. 16B | Octene-1 | 0.9 | 76.1 | 30.9 | 0.94 | 2.6 | 8.12 | 30 |
| Ex. 11B | Polym. Ex. 17B | Octene-1 | 0.69 | 70.5 | 3.85 | 1.17 | 2.6 | 7.95 | 26 |
| Ex. 12B | Polym. Ex. 18B | Octene-1 | 0.78 | 73.2 | 9.71 | 1.06 | 2.6 | 8.01 | 28 |
| Ex. 13B | Polym. Ex. 19B | Octene-1 | 0.63 | 82.6 | 52.6 | 1.14 | 2.6 | 7.81 | 15 |
| Ex. 14B | Polym. Ex. 20B | Octene-1 | 0.86 | 86.3 | 45.9 | 0.89 | 2.6 | 7.97 | 29 |
| Ex. 15B | Polym. Ex. 21B | 4-Methyl-pentene-1 | 0.49 | 80.4 | -0.8 | 1.38 | 2.6 | 7.83 | 13 |
| Ex. 16B | Polym. Ex. 22B | 4-Methyl-pentene-1 | 0.81 | 80.9 | 13.2 | 0.97 | 2.6 | 8.03 | 30 |

The Figure is a graph plotting the kinematic viscosity at 100° C. (KV100) versus the shear stability (SSI) of the lubricating oil compositions obtained in Examples B, Examples C and Comparative Example B. Under similar shear stability (SSI) conditions, Examples B (ethylene/butene-1 copolymers, ethylene/octene-1 copolymers, and ethylene/4-methyl-pentene-1 copolymers) compared favorably to and resulted in lower KV100 than Examples C and Comparative Example B (ethylene/propylene copolymers).

The invention claimed is:

1. A lubricating oil composition comprising an ethylene/α-olefin copolymer (A) having more than 70 mole % and not more than 90 mole % of structural units derived from ethylene and an intrinsic viscosity [η] of 0.3 to 1.0 dl/g, wherein the copolymer (A) is an ungrafted copolymer of ethylene and 4-methyl-pentene-1 having no less than 10 mole % and no more than 28 mole % of structural units derived from 4-methyl-pentene-1.

2. The lubricating oil composition according to claim 1, wherein the copolymer (A) is a copolymer showing a melting point of not more than 100° C. or no melting point as measured with a differential scanning calorimeter (DSC).

3. The lubricating oil composition according to claim 1, further comprising a lubricant base oil (B).

4. The lubricating oil composition according to claim 1, which is an engine oil.

5. A lubricating oil viscosity modifier comprising an ungrafted copolymer of ethylene and 4-methyl-pentene-1, the copolymer having more than 70 mole % and not more than 90 mole % of structural units derived from ethylene and having no less than 10 mole % and no more than 28 mole % of structural units derived from 4-methyl-pentene-1, and an intrinsic viscosity [η] of 0.3 to 1.0 dl/g.

6. The lubricating oil composition according to claim 1, which has a kinematic viscosity at 100° C. of 7.4 to 14.7 mm$^2$/s and is an engine lubricating oil composition.

7. The lubricating oil composition according to claim 1, wherein the copolymer (A) is a copolymer showing a melting point of not more than 100° C. or no melting point as measured with a differential scanning calorimeter (DSC), and
the composition is an engine lubricating oil composition.

8. The lubricating oil composition according to claim 1, wherein the copolymer (A) has 79 to 90 mole % of structural units derived from ethylene, and
the composition is an engine lubricating oil composition.

9. The lubricating oil composition according to claim 1, which further comprises a lubricant base oil (B) and
is an engine lubricating oil composition.

10. The lubricating oil composition according to claim 1, wherein the ethylene/α-olefin copolymer (A) having not less than 70.5 mole % and not more than 90 mole % of structural units derived from ethylene.

11. The lubricating oil composition according to claim 1, wherein the ethylene/α-olefin copolymer (A) having not less than 86.3 mole % and not more than 90 mole % of structural units derived from ethylene.

12. The lubricating oil composition according to claim 1, wherein the ethylene/α-olefin copolymer (A) having more than 86.3 mole % and not more than 87.1 mole % of structural units derived from ethylene.

* * * * *